W. H. HARRISS.
BALE COVER.
APPLICATION FILED JULY 8, 1909.
983,492.
Patented Feb. 7, 1911.
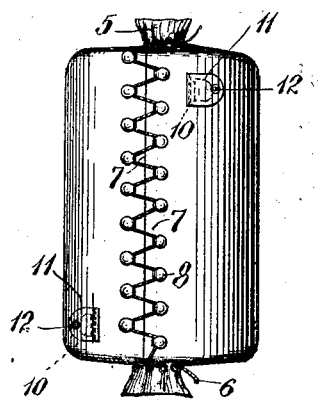
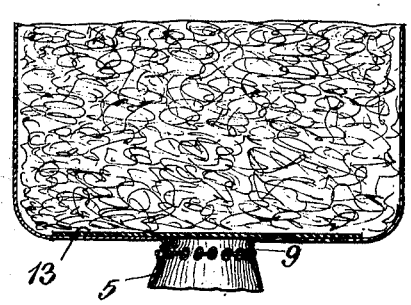
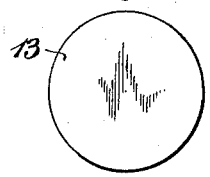
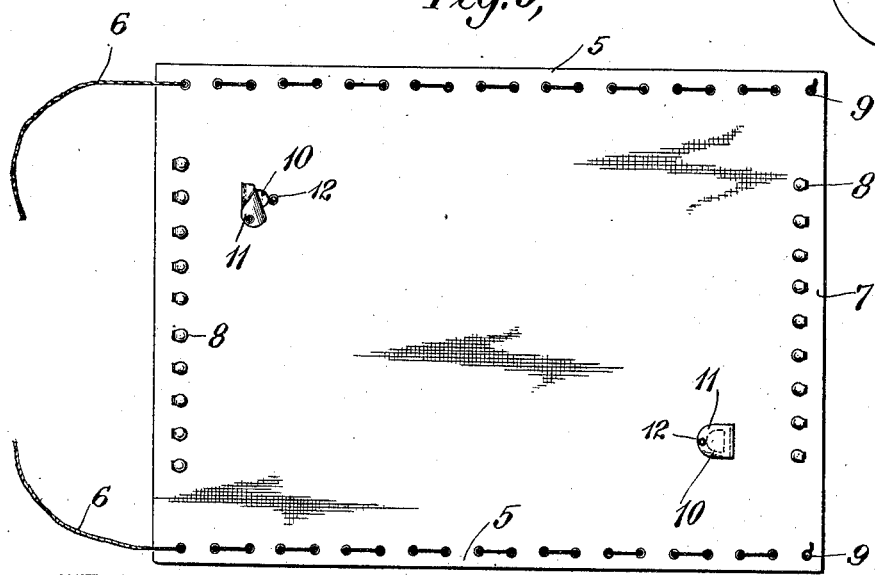

UNITED STATES PATENT OFFICE.

WILLIAM H. HARRISS, OF PAWTUCKET, RHODE ISLAND, ASSIGNOR TO EMPIRE DUPLEX GIN COMPANY, OF NEW YORK, N. Y., A CORPORATION OF ARIZONA TERRITORY.

BALE-COVER.

983,492. Specification of Letters Patent. Patented Feb. 7, 1911.

Application filed July 8, 1909. Serial No. 506,500.

*To all whom it may concern:*

Be it known that I, WILLIAM H. HARRISS, a citizen of the United States of America, and a resident of Pawtucket, county of Providence, and State of Rhode Island, have invented certain new and useful Improvements in Bale-Covers, of which the following is a specification, reference being had to the accompanying drawings, forming a part thereof.

My invention relates to improvements in bale covers and particularly to covers for cylindrical cotton bales.

The objects of my invention are, first, to provide a covering which will completely inclose the bale so that every part thereof will be protected; second, to so provide that the cover may be readily and quickly adjusted in place and easily removed without destruction; and third, to provide whereby the bale may be sampled without it being necessary to remove the bale cover or to undo the main fastening devices thereof. I also preferably form the cover of water-proof and fire-proof material so that it will form a protection to the contents against the elements.

In order that my invention may be fully understood, I will now proceed to describe an embodiment thereof, having reference to the accompanying drawings illustrating the same, and will then point out the novel features in claims.

In the drawings: Figure 1 is a view in side elevation of a bale with a cover embodying my invention shown in position thereon. Fig. 2 is a view upon an enlarged scale of the end of the bale with the cover thereof in longitudinal section. Fig. 3 is a detail view of the complete cover detached from the bale, showing the same spread out flat. Fig. 4 is a detail detached view of an end piece which may be employed. Fig. 5 is a detail fragmentary view showing one of the end pieces as attached to the main body portion of a cover.

The bale cover may be composed of any desired material such as canvas, duck or other suitable fabric, and I preferably render the same water-proof by any of the well known methods such as by treating the fabric with oil, rubber, rubber solution and so forth, and in addition thereto I preferably apply a fire proofing compound so that the cover will not only be impervious to moisture but will also resist action by fire. When spread out the cover is conveniently of rectangular form as is shown in Fig. 3, the opposite end edges 5 being provided with draw strings 6. The side edges 7 are provided with a plurality of fastening devices 8 which may conveniently be in the form of hooks or holes similar to those used on lace shoes, and in proximity thereto, I provide a cord or lace 9 for co-action therewith. The body portion of the cover is provided with one or more openings 10 therein, the said opening being protected by flaps 11, and the flaps, if desired, may be provided with fastening devices such, for instance, as snap buttons 12 similar to those used on gloves. In the form of cover illustrated, I have shown two such openings and flaps in connection therewith, and in Fig. 3 one of the flaps is turned back to expose the opening 10 beneath it. The form of bale for which I have particularly designed this cover is a cylindrical cotton bale, though it will, of course, be understood that other forms of bale may be employed, the cover being made of the proper size and shape to conform to the size and shape of the bale to be covered. The cover is applied by wrapping it around the bale in cylindrical form, then lacing the side edges 7 by applying the lace 9 backward and forward over the hooks 8, and then suitably tying it at the end. The strings 6 are finally drawn tight so as to contract the ends of the cover over the end of the bale, the strings being then suitably wrapped around the contracted ends and tied in place. Disks of fabric similar to the disk 13 shown in Fig. 4 may be inserted in the end of the bale, if desired, before tying up the cover ends, so as to completely inclose and protect the ends of the bale. The disks 13 employed may be a part separate from the main body of the cover or if preferred, they may be secured at proper points upon the inside thereof as is shown at 14 in Fig. 5, if preferred. A bale cover thus constructed and applied forms a complete covering for the material contained therein, and protects it not only against injury in handling but also against injury from the action of the elements.

Baled cotton is commonly sold by sample, a sample of the material being taken directly from the bale, and for this purpose it has been common in the past to leave a portion of the bale exposed, as otherwise it would have been necessary to open the bale to obtain access to the material. In the present form of bale cover, however, a sample may be readily taken at one or more points through the openings 10 by merely lifting the flaps 11. This permits sampling to be effected without opening the bale and without leaving any portion of the bale normally exposed.

What I claim is:

1. A bale cover comprising a piece of fabric provided with draw strings at the ends thereof, and detachable fastening means including fastening devices disposed all the way along the side edges.

2. A bale cover comprising a piece of fabric provided with draw strings at the end edges, and lace receiving elements all the way along the side edges thereof.

3. A bale cover comprising a piece of fabric having side and end fastening devices and provided with a flap protected opening.

4. A bale cover comprising a piece of fabric having side and end fastening devices and having openings therein, flaps for protecting the openings, and means for fastening the flaps over the openings.

5. A bale cover comprising a piece of fabric provided with draw strings at the opposite ends thereof, and co-acting fastening devices at the opposite sides thereof, said fabric being provided with an opening intermediate the ends, and means for protecting the said opening.

WILLIAM H. HARRISS.

Witnesses:
E. V. Sutton,
Clara E. Nerr.